(12) United States Patent
Lim et al.

(10) Patent No.: US 8,768,512 B2
(45) Date of Patent: Jul. 1, 2014

(54) ROBOT AND CONTROL METHOD THEREOF

(75) Inventors: San Lim, Suwon-si (KR); Myung Hee Kim, Suwon-si (KR); Kyung Shik Roh, Seongnam-si (KR); Young Bo Shim, Seoul (KR); Bok Man Lim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 221 days.

(21) Appl. No.: 13/327,857

(22) Filed: Dec. 16, 2011

(65) Prior Publication Data

US 2012/0165979 A1 Jun. 28, 2012

(30) Foreign Application Priority Data

Dec. 28, 2010 (KR) ........................ 10-2010-0136866

(51) Int. Cl.
*G05B 19/04* (2006.01)
(52) U.S. Cl.
USPC .......................................... 700/253; 345/473
(58) Field of Classification Search
USPC ................ 700/253, 245–247, 259, 260–262;
901/1, 2, 14, 31, 34, 46; 345/473, 474;
318/568.1, 568.2, 568.12, 568.16,
318/568.17
See application file for complete search history.

(56) References Cited

U.S. PATENT DOCUMENTS

| | | | | |
|---|---|---|---|---|
| 5,513,299 A | * | 4/1996 | Terasaki et al. | 700/255 |
| 7,415,321 B2 | * | 8/2008 | Okazaki et al. | 700/245 |
| 7,558,647 B2 | * | 7/2009 | Okazaki | 700/260 |
| 8,396,594 B2 | * | 3/2013 | Okazaki | 700/253 |
| 8,452,449 B2 | * | 5/2013 | Iida | 700/253 |

* cited by examiner

*Primary Examiner* — Dalena Tran
(74) *Attorney, Agent, or Firm* — Staas & Halsey LLP

(57) ABSTRACT

A robot and a control method thereof. The control method includes generating and storing plural grasping motions corresponding to data of a target object, selecting a grasping motion corresponding to a grasping purpose of the target object among the plural grasping motions, generating a path of arms corresponding to the selected grasping motion, calculating torques to track the path of the arms, and outputting the torques toward the arms so as to perform movement of the arms and grasping of the target object. The grasping motion path corresponding to the grasping purpose is generated and the path of arms is generated, thereby reducing overall calculation time during grasping of the target object to increase calculating efficiency, minimizing generation of the path of the arms, and allowing an arm path calculating process to be performed at the late stage of a grasping control process to improve grasping performance.

23 Claims, 10 Drawing Sheets

ROBOT AND CONTROL METHOD THEREOF

CROSS-REFERENCE TO RELATED APPLICATIONS

This application claims the benefit of Korean Patent Application No. 2010-0136866, filed on Dec. 28, 2010 in the Korean Intellectual Property Office, the disclosure of which is incorporated herein by reference.

BACKGROUND

1. Field

Embodiments relate to a robot, which naturally and stably grasps an object, and a control method thereof.

2. Description of the Related Art

In general, robots are machines which have a joint system similar to that of a human and perform the same motions as those of human hands and legs using such a joint system.

Industrial robots for automation and unmanned operation of production in factories were the first to be introduced. Recently, vigorous development of service robots to supply various services to humans is underway.

Such robots include robot hands to grasp objects so as to exchange and cooperate with humans in daily life.

A robot hand is formed in the shape of plural fingers or a gripper similarly to a human hand, and each finger has at least 1 degree of freedom and performs precise, flexible and stable operation by adjusting stiffness of the tip thereof.

The robot repeats calculation of relative positions of hands to an object and planning of paths of arms so that the hands may move to the object based on the positions of the hands during grasping of the object.

In this case, the planning of the paths of the arms requires a larger amount of calculation and longer time than the calculation of the relative positions of the hands to the object.

Further, if an obstacle is present around an object, it is difficult to grasp the object and the grasping motion may fail. Whenever the robot hand grasps an object, a portion of the object to be grasped needs to set and this causes troublesomeness.

SUMMARY

Therefore, it is an aspect of an embodiment to provide a robot, which grasps a target object based on a predetermined grasping motion, and a control method thereof.

It is another aspect of an embodiment to provide a robot, which grasps a target object corresponding to a desired purpose of a user, and a control method thereof.

It is another aspect of an embodiment to provide a robot, which, if a hand to perform grasping has difficulty in grasping a target object, performs grasping of the target object with the help of another hand, and a control method thereof.

It is another aspect of an embodiment to provide a robot, which generates continuous grasping motion paths and generates paths of arms by selecting one from the generated grasping motion paths, and a control method thereof.

It is a further aspect of an embodiment to provide a robot, which calculates costs on respective grasping motion paths and selects one grasping motion path having the minimum cost from the respective grasping motion paths, and a control method thereof.

Additional aspects of embodiments will be set forth in part in the description which follows and, in part, will be obvious from the description, or may be learned by practice of embodiments.

In accordance with an aspect of an embodiment, a robot includes a database unit to store a plurality of grasping motions of each of target objects, an input unit to receive data of a target object, a grasping motion path generation unit to decide a target grasping motion among the plurality of grasping motions based on a grasping purpose among the data of the target object and to decide a grasping motion path based on the target grasping motion, an arm path generation unit to generate a path of arms corresponding to the grasping motion path, and a control unit to calculate torques to track the path of the arms and to output the torques to the arms so as to control movement of the arms and to control grasping of the target object.

The arm path generation unit, if generation of the path of the arms corresponding to the grasping motion path fails during generation of the path of the arms, may store the failed grasping motion path and transmits the failed at least one grasping motion path to the grasping motion path generation unit.

During storage of the failed grasping motion path, the arm path generation unit may store the former grasping motions, including successful grasping motions among plural grasping motions forming the failed grasping motion path, as a successful path and store the grasping motions after the failed grasping motion as a failed path.

The grasping motion path generation unit may generate a first node using at least one initial grasping motion which a first hand may perform, judge whether or not the target grasping motion is present among the at least one initial grasping motion of the first node, complete expansion of a tree structure if the target grasping motion is present among the first node, and expand lower nodes from the first node so as to generate the tree structure if no target grasping motion is present among the first node.

The grasping motion path generation unit, if a second hand performs grasping of the target object, may generate a first node using at least one initial grasping motion which a first hand may perform, generate a second node using at least one grasping motion which the second hand may perform during the at least one initial grasping motion, judge whether or not the target grasping motion is present among the second node, complete expansion of a tree structure if the target grasping motion is present among the second node, and expand lower nodes from the second node so as to generate the tree structure if no target grasping motion is present among the second node.

The grasping motion path generation unit may generate the grasping motion path by connecting the target motion performed by the second hand to the at least one initial grasping motion performed by the first hand.

The arm path generation unit may generate the path of the arms corresponding to the order of the grasping motions forming the grasping motion path.

The arm path generation unit, if a plurality of grasping motion paths is decided, may generate paths of the arms respectively corresponding to the plurality of grasping motion paths, calculate costs of the paths the arms, and decide a path of the arms having the minimum cost.

The robot may include a detection unit to capture an image of the target object and a surrounding image of the target object, and a target object recognition unit to recognize a position of the target object and an obstacle around the target object and to recognize a position of the obstacle, and the grasping motion path generation unit may decide an initial grasping motion based on the position of the target object and the position of the obstacle.

The detection unit may be an image capturing unit to capture the image of the target object, or a distance sensor or an RF sensor to detect the image of the target object.

In accordance with another aspect of an embodiment, a control method of a robot includes recognizing a current position of a target object by detecting the target object when the robot receives data of the target object, deciding an initial grasping motion performed by a first hand among a plurality of grasping motions stored in advance based on the current position of the target object, deciding a target grasping motion performed by a second hand among the plurality of grasping motions stored in advance based on a grasping purpose of the target object, generating a tree structure based on the initial grasping motion, generating a grasping motion path connecting the initial grasping motion to the target grasping motion based on the tree structure, generating a path of arms corresponding to the grasping motion path, calculating torques to track the path of the arms, controlling movement of the arms by outputting the torques toward the arms, and controlling grasping of the target object from the first hand to the second hand.

The decision of the initial grasping motion may include judging whether or not an obstacle is present adjacent to the target object from surrounding data of the target object, recognizing a position of the obstacle, and deciding the initial grasping motion by utilizing the position of the obstacle.

The surrounding data of the obstacle may be obtained based on a detected surrounding image of the target object.

The surrounding data of the obstacle may be obtained based on a signal output from a distance sensor or an RF sensor and reflected by the target object.

The generation of the path of the arms corresponding to the grasping motion path may include, if the generation of the path of the arms fails, storing the failed grasping motion path, and utilizing data regarding the failed grasping motion path during generation of the next grasping motion path.

The utilization of the data regarding the failed grasping motion path during generation of the next grasping motion path may include storing the former grasping motions, including successful grasping motions among plural grasping motions forming the failed grasping motion path, as a successful path, and storing the grasping motions after the failed grasping motion as a failed path.

The generation of the grasping motion path may include generating a first node using at least one initial grasping motion which a first hand may perform, generating a second node using at least one grasping motion which the second hand may perform during the at least one initial grasping motion, judging whether or not the target grasping motion is present among the second node, and completing expansion of a tree structure if the target grasping motion is present among the second node, and expanding lower nodes from the at least one grasping motion of the second node so as to generate the tree structure if no target grasping motion is present among the second node.

The generation of the path of the arms may include, if a plurality of grasping motion paths is generated, generating paths of the arms respectively corresponding to the plurality of grasping motion paths, calculating costs of the paths the arms, and deciding a path of the arms having the minimum cost.

The control method may further include storing the path of the arms having the minimum cost.

The control method may further include, if the robot receives data of an object from a user, detecting the data of the object, and generating a plurality of grasping motions based on the data of the object and storing the plurality of grasping motions.

In accordance with another aspect of an embodiment, a control method of a robot includes generating a plurality of grasping motions corresponding to data of a target object and storing the plurality of grasping motions, selecting a grasping motion corresponding to a grasping purpose of the target object among the plurality of grasping motions, generating a path of arms corresponding to the selected grasping motion, calculating torques to track the path of the arms, and outputting the torques toward the arms so as to perform movement of the arms and grasping of the target object.

The control method may further include, if a plurality of grasping motions is decided, generating paths of the arms corresponding to the plurality of grasping motions, calculating costs of the paths the arms, and selecting a grasping motion corresponding to a path of the arms having the minimum cost.

The costs may be based on at least one of moving times, moving distances and energy consumption rates of the arms.

BRIEF DESCRIPTION OF THE DRAWINGS

These and/or other aspects of embodiments will become apparent and more readily appreciated from the following description of the embodiments, taken in conjunction with the accompanying drawings of which.

DETAILED DESCRIPTION

Figure 1:
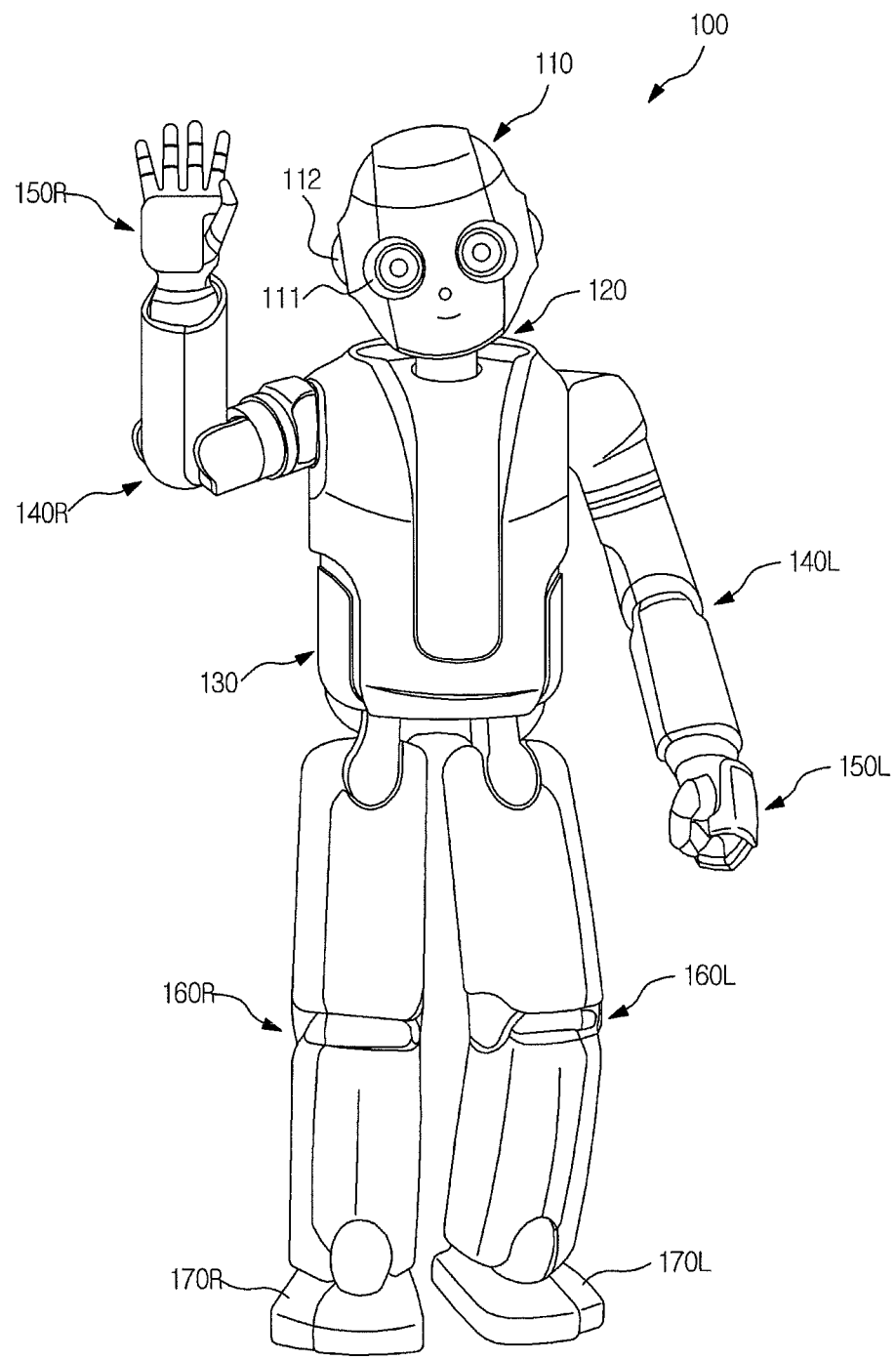
FIG. 1 is an exemplary view of a robot in accordance with an embodiment.

Reference will now be made in detail to embodiments, examples of which are illustrated in the accompanying drawings, wherein like reference numerals refer to like elements throughout.

Although embodiments exemplarily illustrate a humanoid robot having a similar shape to a human as a robot performing grasping, a robot having hands, each of which includes two or three grippers, may be used as the robot performing grasping.

Figure 2:
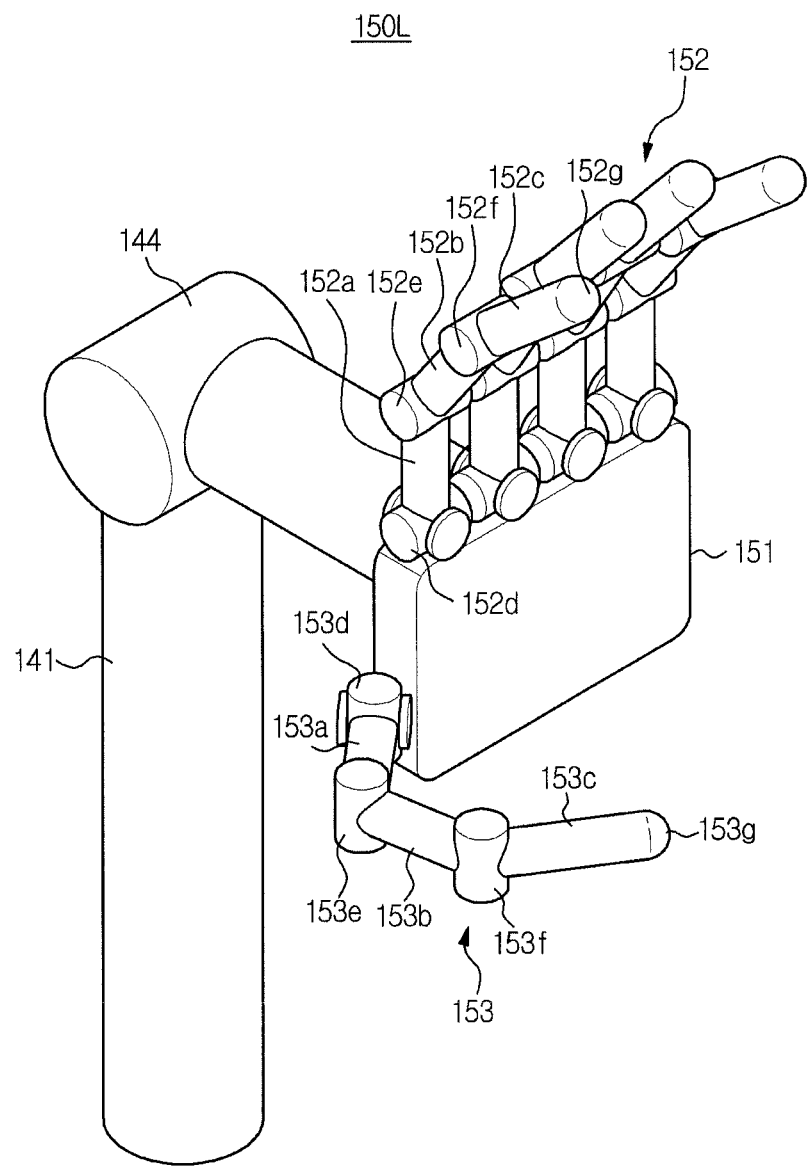
FIG. 2 is a schematic exemplary view of a hand of the robot in accordance with an embodiment.

FIG. 1 is an exemplary view of a robot in accordance with an embodiment and FIG. 2 is a schematic exemplary view of a hand of the robot in accordance with an embodiment.

As shown in FIG. 1, a robot 100 to perform grasping includes an upper body including a head 110, a neck 120, a torso 130, arms 140R and 140L and hands 150R and 150L, and a lower body including a plurality of legs 160R and 160L and feet 170R and 170L.

In more detail, the upper body of the robot 100 includes the head 110, the torso 130 connected to the lower portion of the head 110 through the neck 120, the two arms 140R and 140L connected to both sides of the upper portion of the torso 130, and the hands 150R and 150L respectively connected to tips of the two arms 140R and 140L.

Cameras 111 to capture surrounding images and microphones 112 to detect a user's voice are installed on the head 110.

Each of the two arms 140R and 140L includes an upper arm link, a lower arm link, an elbow joint unit, and a wrist joint unit.

Here, the upper arm links (not shown) of the two arms 140R and 140L are respectively connected to the torso 130 through shoulder joint units and are respectively connected to the lower arm links (not shown) through the elbow joint units (not shown). The lower arm links (not shown) are connected to the hands 150R and 150L through the wrist joint units (not shown).

Each elbow joint unit (not shown) includes a rotary joint in the pitch direction and a rotary joint in the yaw direction, and thus has 2 degrees of freedom. Each wrist joint unit (not shown) includes a rotary joint in the pitch direction and a rotary joint in the roll direction, and thus has 2 degrees of freedom.

Each hand 150R or 150L includes a palm 151 and five fingers 152 and 153. Each of the fingers 152 and 153 includes link members 152a, 152b, 152c or 153a, 153b, 153d and a plurality of joints 152d, 152e, 152f or 153d, 153e 153f driven by motors (not shown).

The hands 150R and 150L perform various motions, such as grasping of an object or pointing in a specific direction, in connection with movement of the arms 140R and 140L.

Actuators, such as motors (not shown), are provided on the respective joints of the robot 100. Thereby, the respective joints perform proper rotating movements through rotation of the motors, thus achieving various motions.

The lower body of the robot 100 includes the two legs 160R and 160L connected to both sides of the lower portion of the torso 130 of the upper body, and the feet 170R and 170L respectively connected to tips of the two legs 160R and 160L.

Here, the head 110, the two arms 140R and 140L, the two hands 150R and 150L, the two legs 160R and 160L, and the two feet 170R and 170L respectively have designated degrees of freedom through joints.

Such upper and lower bodies of the robot 100 are protected by a cover.

Here, "R" and "L" respectively indicate the right and left sides of the robot 100.

Hereinafter, with reference to FIG. 2, the hands 150R and 150L of the robot 100 will be described in more detail.

The right and left hands 150R and 150L of the robot 100 have the same structure, and thus the left hand 150L of the robot 100 will be exemplarily described.

As shown in FIG. 2, the left hand 150L of the robot includes the palm 151 and the plural fingers 152 and 153 connected to the palm 151, and the palm 151 is connected to the arm 140L with at least 1 degree of freedom.

The plural fingers 152 and 153 include plural first fingers 152 extended from the edge of one end of the palm 151 in the same direction and bent in the direction of the palm 151, and at least one second finger 153 extended in the different direction from the first fingers 152 and bent in the direction of the palm 151.

The plural first fingers 152 respectively correspond to the index finger, the middle finger, the ring finger and the little finger of a human hand, and the at least one second finger 153 corresponds to the thumb of the human hand.

Each of the plural first fingers 152 includes the plural link members 152a, 152b and 152c and the plural joints 152d, 152e and 152f driven by motors (not shown), and the second finger 153 includes the plural link members 153a, 153b and 153c and the plural joints 153d, 153e and 153f driven by motors (not shown).

The plural link members 152a, 152b and 152c provided on each of the plural first fingers 152 are referred to as a first link member 152a, a second link member 152b and a third link member 152c in order of proximity to the palm 151, and the plural joints 152d, 152e and 152f provided on each of the plural first fingers 152 are referred to as a first joint 152d, a second joint 152e and a third joint 152f in order of proximity to the palm 151.

Here, the first joint 152d of the first finger 152 connects the palm 151 and the first link member 152a, the second joint 152e of the first finger 152 connects the first link member 152a and the second link member 152b, and the third joint 152f of the first finger 152 connects the second link member 152b and the third link member 152c.

The plural link members 153a, 153b and 153c provided on the second finger 153 are referred to as a first link member 153a, a second link member 153b and a third link member 153c in order of proximity to the palm 151, and the plural joints 153d, 153e and 153f provided on the second finger 153 are referred to as a first joint 153d, a second joint 153e and a third joint 153f in order of proximity to the palm 151.

Here, the first joint 153d of the second finger 153 connects the palm 151 and the first link member 153a, the second joint 153e of the second finger 153 connects the first link member 153a and the second link member 153b, and the third joint 153f of the second finger 153 connects the second link member 153b and the third link member 153c.

An encoder (not shown) to measure a joint angle 8 is installed at the tip of the third link member 152f of the first finger 152, i.e., the fingertip of the first finger 152 corresponding to the fingernail of a human hand, and an encoder (not shown) to measure a joint angle θ is installed at the tip of the third link member 153f of the second finger 153, i.e., the fingertip of the second finger 153 corresponding to the fingernail of the human hand.

Figure 3:
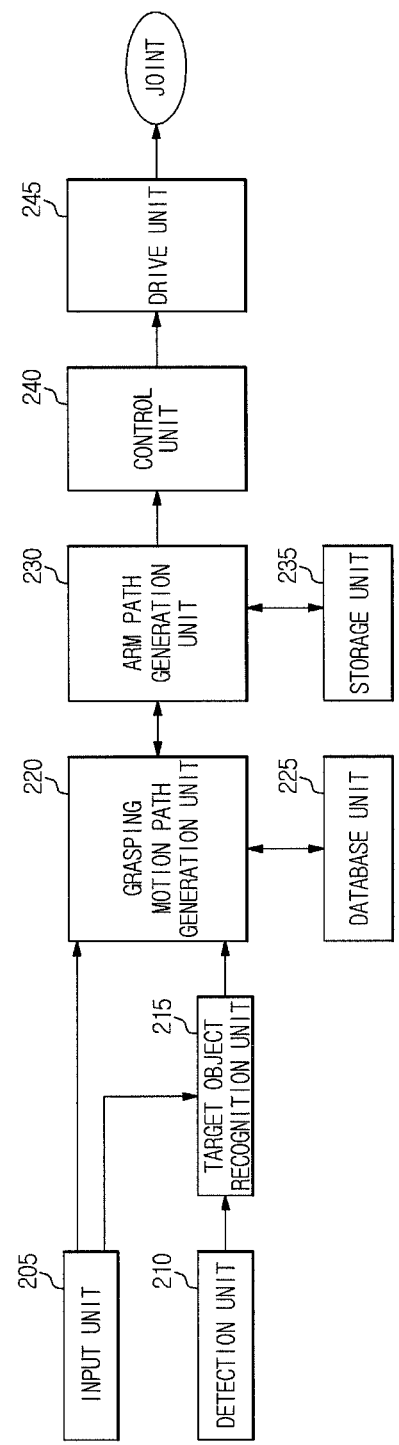
FIG. 3 is block diagram illustrating grasping control of the robot in accordance with an embodiment.

FIG. 3 is block diagram illustrating grasping control of the robot in accordance with an embodiment. The robot includes an input unit 205, a detection unit 210, a target object recognition unit 215, a grasping motion path generation unit 220, a database unit 225, an arm path generation unit 230, a storage unit 235, a control unit 240, and a drive unit 245.

The input unit 205 receives data of a target object to be grasped from a user. Here, data of target objects include names of the target objects, hands to grasp the target objects, grasping purposes of the target objects, and target positions at which the target objects will be located.

The grasping purposes include working, moving and sticking, the target positions include a position at which operation will be performed using a target object if the grasping purpose is working, a position to which a target object will be moved if the grasping purpose is moving, and a position at which a target object will be stuck if the grasping purpose is sticking.

Further, as a hand to grasp a target object, a hand located adjacent to the target position based on the grasping purpose may be automatically decided.

Further, the input unit 205 may function as a communication unit to receive data of the target object transmitted from the outside.

The detection unit 210 detects an image around the target object using a device, such as the camera 111 or a camcorder.

The camera 111 or the camcorder captures an image of a subject using light, and includes a light condensation unit (not shown) upon which light is condensed, an image pickup unit (not shown) to sense the condensed light and to convert a signal of the sensed light into an electrical signal, and an A/D conversion unit (not shown) to convert the electrical signal into a digital signal.

Here, the image pickup unit serves to perform exposure, gamma, gain adjustment, white balance and color matrix. The image pickup unit may be formed by an image sensor, such as a charge coupled device (CCD) or a complementary metal oxide semiconductor (CMOS).

The detection unit 210 may detect the target object using a distance sensor, such as a laser scanner. That is, the detection unit 210 may detect the shape of the target object using a signal reflected by the target object.

Further, the detection unit 210 may detect a position or pose of an RF tag by reading data of the target object stored in advance using a radio frequency (RF) sensor.

The target object recognition unit 215 removes noise from an acquired image by filtering the image, performs pretreatment, recognizes the target object from the image based on data of the target object, confirms a position of the target object, judges whether or not an obstacle is present around the target object, and confirms a position of the judged obstacle.

Further, the target object recognition unit 215 may confirm the position of the target object based on sensing data detected through the distance sensor or the RF sensor, judge whether or not an obstacle is present around the target object, and confirm a position of the obstacle.

Here, the target object recognition unit 215 judges whether or not the position of the obstacle is adjacent to the target object or a collision with the obstacle during grasping the target object is expected.

The grasping motion path generation unit 220 decides the initial grasping motion, i.e., a first grasping motion, based on the position of the target object or the position of the obstacle, decides a target grasping motion based on the grasping purpose of the target object, and generates grasping motion paths to transit from the first grasping motion to the target grasping motion.

Here, the plural grasping motion paths to transit from the first grasping motion to the target grasping motion are formed in a tree structure.

The tree structure represents grasping motion paths between the first hand and the second hand in a tree shape so as to allow the first hand to grasp the target object and to transmit the target object to the second hand and then to allow the second hand to regrasp the target object, if the second hand to grasp the target object is distant from the target object or if the second hand is selected as a hand by which a user will grasp the target object.

In more detail, when data of at least one target object received by the input unit 205 are transmitted to the grasping motion path generation unit 220 and recognition data of the target object are transmitted to the grasping motion path generation unit 220 through the target object recognition unit 215, the grasping motion path generation unit 220 recognizes a state of the target object and an obstacle around the target object based on the recognition data of the target object.

Further, the grasping motion path generation unit 220 decides the initial grasping motion, i.e., the first grasping motion, based on the state of the target object and the obstacle, and decides the target grasping motion corresponding to the grasping purpose. Here, the decision of the first grasping motion or the target grasping motion is carried out by selecting one from plural grasping motions stored in the database unit 225.

The grasping motion path generation unit 220 forms a first node using at least one first grasping motion, generates a tree structure to track the target grasping motion at the at least one first grasping motion forming the first node, and transmits the generated tree structure to the arm path generation unit 230.

If the first hand initially grasps the target object and then the second hand perform the target grasping motion, the grasping motion path generation unit 220 generates second nodes of the first grasping motions of the first hand forming the first node, if the target grasping motion is present among second grasping motions of the second hand forming the second nodes, completes expansion of the target grasping motion, generates third nodes by respectively expanding the second grasping motions of the second hand, which are not the target grasping motion, generates fourth nodes of third grasping motions of the first hand forming the third nodes, if the target grasping motion is present among fourth grasping motions of the second hand forming the fourth nodes, completes expansion of the target grasping motion, generates fourth nodes by respectively expanding the fourth grasping motions of the second hand, which are not the target grasping motion.

As described above, the grasping motion path generation unit 220 forms the tree structure while expanding lower nodes of the respective grasping motions until the target grasping motion is detected from the grasping motions of the second hand.

Further, the grasping motion path generation unit 220 may generate a grasping motion path using only the target grasping motion of the first hand so that the first hand performs the target grasping motion, if the first hand is to grasp the target object, the target object is located at a position close to the first hand and the first hand is capable of performing the target grasping motion.

The grasping motion path generation unit 220 may generate a plurality of grasping motion paths to perform target grasping motions during the first grasping motion and select a grasping motion path having the minimum cost from the generated plural grasping motion paths.

Here, the grasping motion path having the minimum cost is a path which allows a frequency of regrasping the target object between the two hands to be reduced and causes the two hands to take natural poses when the two hands exchange the target object based on position data of the two hands.

The grasping motion path generation unit 220, when the grasping motion path generation unit 220 receives data of a new object through the input unit 205 and an image of the corresponding object is transmitted to the grasping motion path generation unit 220, stores the received data of the object and data regarding the transmitted image of the object in the database unit 225, registers the object having the stored data as a target object, generates grasping motions of the target object corresponding to a grasping position and a grasping direction of the registered object, and transmits the generated grasping motions to the database unit 225.

Here, the image of the object is at least one of an image of the object detected by the detection unit 210 and image data of the object acquired using the distance sensor or the RF sensor.

This will be described with reference to FIG. 4, as follows.

Figure 4:
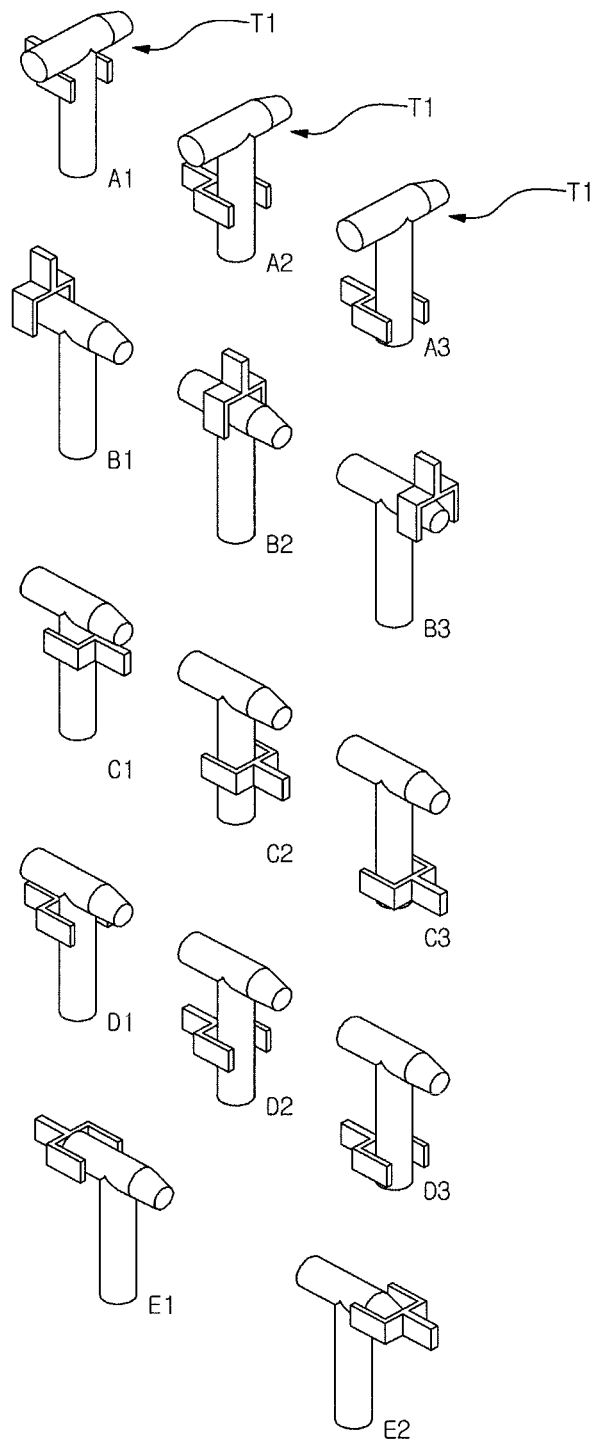
FIG. 4 is a view illustrating examples of grasping motions of the robot in accordance with an embodiment, if a target object is a hammer.

FIG. 4 is a view illustrating examples of grasping motions of the robot in accordance with an embodiment, if a target object is a hammer.

In case of a hammer including a handle and a hitting member, as shown in FIG. 4, a graspable position of the hammer is one of the handle and the hitting member. Here, grasping motions are generated according to grasping positions and directions, and codes are respectively assigned to the generated grasping motions.

In more detail, plural grasping motions A1, A2, A3, C1, C2, C3, D1, D2 and D3, in which the upper, middle and lower portions of the handle of the hammer T1 are grasped, are generated according to relative directions of the hand to the hitting member during grasping.

Further, plural grasping motions B1, B2 and B3, in which the left, middle and right portions of the hitting member of the hammer T1 are grasped, are generated, and plural grasping motions E1 and E2, in which both side surfaces of the hitting member of the hammer T1 are grasped, are generated.

The grasping motion path generation unit 220 stores target grasping motions corresponding to grasping purposes.

During generation of the target grasping motion, the grasping motion path generation unit 220 may evaluate suitabilities of grasping motions according to a grasping purpose, store at least one grasping motion as a target grasping motion, and select one among the at least one target grasping motion or assigns priorities to the at least one target grasping motion according to suitability and then store the at least one target grasping motion in descending order of priority.

For example, in case of the hammer, grasping motions in which the middle or lower portion of the handle is grasped so as to achieve easiness in working are selected, and then the grasping motions C2 and C3, in which a hitting surface is located in the opposite direction of an arm, among the selected grasping motions are stored as target grasping motions.

The database unit 225 stores image data of plural target objects and stores plural grasping motion data of each of the target objects. Here, the grasping motion data of each of the target objects are provided in plural number corresponding to grasping positions and grasping directions of each of the target objects, which may be performed by the hand of the robot.

The database unit 225 stores target grasping motions corresponding to the grasping purposes of the plural target objects.

Here, during storage of the target grasping motions, suitability of grasping motions corresponding to the grasping purpose are evaluated, and the grasping motion having the highest suitability is stored as a target grasping motion or priorities are assigned to the grasping motions according to suitability and then the grasping motions are stored in descending order of priority as target grasping motions.

The arm path generation unit 230 generates a path of the arms to perform the grasping motions in order corresponding to the grasping motion path.

Here, the arm path generation unit 230 generates the path of the arms in consideration of the inclination of the torso and the angles of the plural joints forming the shoulder joint units, the elbow joint units, wrist joint units and the hands of the robot.

If the path of the arms is not generated in order corresponding to the grasping motion path, the arm path generation unit 230 stores the failed grasping motion path in the storage unit 235, and transmits data regarding the failed grasping motion path to the grasping motion path generation unit 220 so as to decide another grasping motion path.

When the arm path generation unit 230 transmits the failed grasping motion path to the grasping motion path generation unit 220, the arm path generation unit 230 transmits data regarding successful grasping motions of the failed grasping motion path to the grasping motion path generation unit 220.

The arm path generation unit 230 may generate the path of the arms using motion planning, such as a rapidly-exploring random tree (RRT) formed in order of the grasping motions.

In case of an RRT algorithm, random poses are formed through random calculation. Here, unnatural poses may be formed. Therefore, the path of the arms is generated in advance in off-line.

Here, the arm path generation unit 230 selects two grasping motions among plural grasping motions generated in off-line, converts levels of naturalness of joint angles of the arms when the two grasping motions are simultaneously performed into values, stores the values, and generates a path of the arms using the values. As the value decreases, the joint angle of the arm becomes more natural.

Further, the arm path generation unit 230 generates paths of the arms using heuristics. That is, the arm path generation unit 230 calculates costs of the paths based on moving times, moving distances and energy consumption rates of the arms necessary to transfer the target object from the first hand to the second hand based on combinations of upper and lower nodes, and selects the paths in ascending order of calculated cost.

If the path of the arms is not generated, the arm path generation unit 230 selects a different grasping motion at the same node. In order to select the different grasping motion at the same node, various graph search algorithms, such as a breadth first search (BFS) algorithm, a depth first search (DFS) algorithm and an A* search algorithm, may be used.

The storage unit 235 stores a grasping motion path, in which the path of the arms is not generated, among grasping motion paths to perform the target grasping motion during the first grasping motion.

The control unit 240 calculates torques to track the path of the arms based on arm path data transmitted from the arm path generation unit 230, controls pulse width modulation (PWM) of the drive units 245 based on the calculated torques, thereby allowing the respective joints provided on the arms to move. Here, the torque is rotary force of a motor (not shown) to track a target angle.

In more detail, the control unit 240 calculates torques of the rotary joints in the pitch direction and the rotary joints in the roll direction of the shoulder joint units, calculates torques of the rotary joints in the pitch direction and the rotary joints in the yaw direction of the elbow joint units and calculates torques of the rotary joints in the pitch direction and the rotary joints in the roll direction of the wrist joint units based on the path data of the arms.

The control unit 240 calculates torques of the plural joints 152$d$, 152$e$, 152$f$, 153$d$, 153$e$ and 153$f$ of the respective hands 150R and 150L based on the grasping motion path data.

The drive units 245 output PWM signals to track the torques of the respective joints toward the respective joints provided on the arms under instructions of the control unit 240.

In more detail, the drive units 245 drive the rotary joints in the pitch direction and the rotary joints in the roll direction of the shoulder joint units, drive the rotary joints in the pitch direction and the rotary joints in the yaw direction of the elbow joint units and drive the rotary joints in the pitch direction and the rotary joints in the roll direction of the wrist joint units based on the arm path data.

Figure 5:
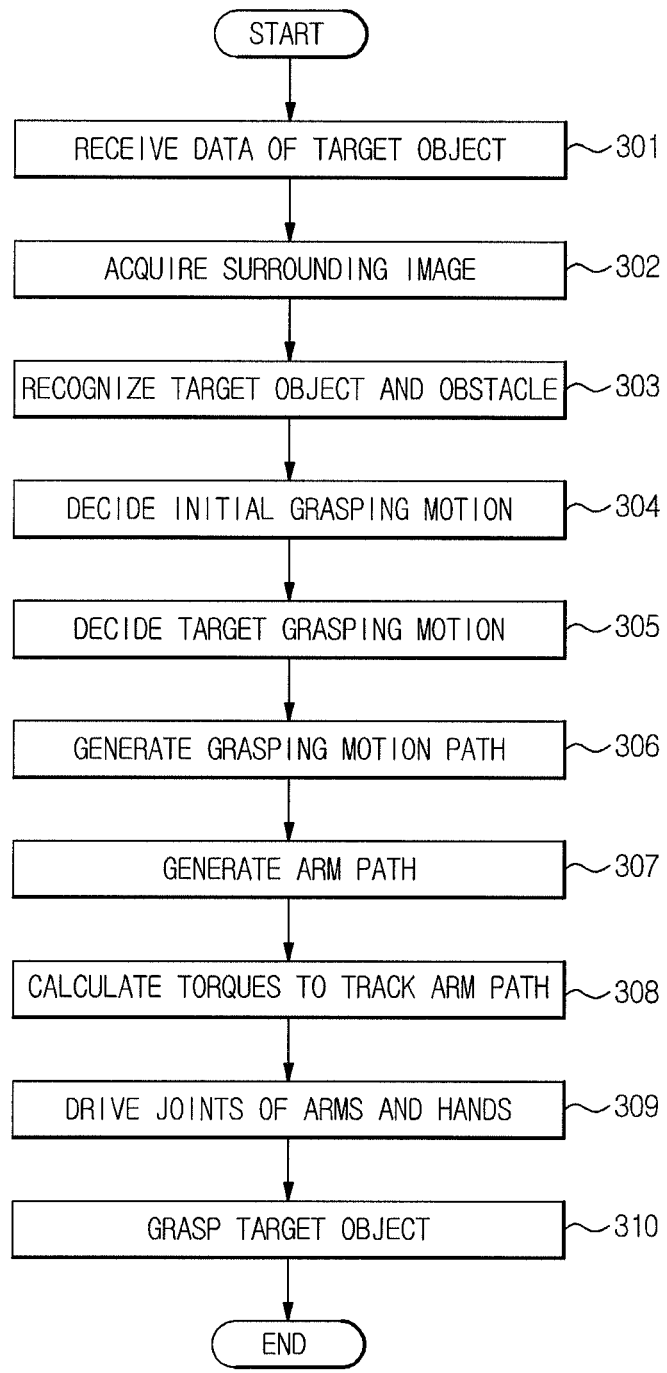
FIG. 5 is a flow chart illustrating a grasping control method of the robot in accordance with an embodiment.

FIG. 5 is a flow chart illustrating a grasping control method of the robot in accordance with an embodiment. Hereinafter, the grasping control method of the robot will be described with reference to FIGS. 6 to 10.

First, when the robot receives data of a target object to be grasped, such as a name of the target object, a hand to grasp the target object, a grasping purpose of the target object and a target point at which the target object will be located, from a user (Operation 301), the robot searches an image of the corresponding target object stored in the database unit 225.

The robot captures a surrounding image (Operation 302), recognizes the target object corresponding to the searched image among the captured image, and recognizes a position of the target object.

Here, the target object may be recognized from the image of the object detected using the distance sensor or the RF sensor of the detection unit 210.

Further, the robot judges whether or not an obstacle is present around the target object, and recognizes a position of the judged obstacle (Operation 303). Here, the robot judges whether or not the position of the obstacle is adjacent to the target object or whether or not collision with the obstacle is expected during grasping of the target object.

Thereafter, the robot respectively calculates a distance between the target object and the first hand and a distance between the target object and the second hand, and judges which hand is adjacent to the target point.

Here, the hand of the robot is provided with a coordinate system, and distances between the hand and the target object and point may be predicted based on the coordinates of the coordinate system. Hereinafter, a case in which a hand to grasp the target object is set to the second hand by the user or a case in which the second hand is adjacent to the target point will be exemplarily described.

When the distance between the second hand and the target object is more than a reference distance under the condition that the second hand is adjacent to the target point, the robot grasps the target object using the first hand adjacent to the target object and then regrasps the target object using the second hand. Here, the reference distance is a distance by which the second hand is movable. This will be described with reference to FIG. 6.

Figure 6:
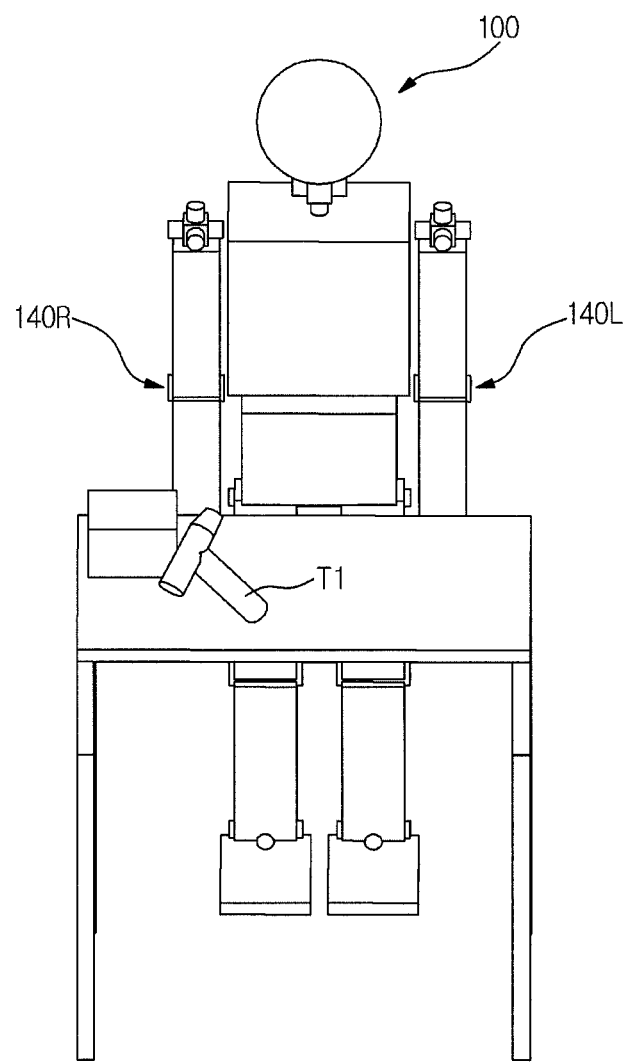
FIG. 6 is an exemplary view illustrating grasping of the robot in accordance with an embodiment.

As shown in FIG. 6, if the robot needs to grasp a hammer T1, i.e., a target object, using the second hand, i.e., the left hand, the hammer T1 is placed on a table, an obstacle is present at a hitting portion of the hammer T1, and a distance between the second hand and the hammer is more than the reference distance.

Therefore, the robot grasps the hammer using the first hand, i.e., the right hand, and then transmits the hammer from the first hand to the second hand so as to regrasp the target object using the second hand.

For this purpose, based on the condition that the obstacle is present around the hitting portion of the hammer T1, the robot decides the initial grasping motion, i.e., the first grasping motion (Operation 304), and decides a target grasping motion based on the grasping purpose of the target object (Operation 305).

Since the obstacle is present at the hitting portion of the hammer T1, the robot generates a tree structure in which the first grasping motion to prevent collision with the obstacle forms a first node, and generates a grasping motion path based on the generated tree structure (Operation 306).

If plural grasping motion paths are generated, one grasping motion path having the minimum cost among the plural grasping motion paths is decided.

Here, the grasping motion path having the minimum cost is a path which allows a frequency of regrasping the target object between the two hands to be reduced and causes the two hands to take natural poses when the two hands exchange the target object based on position data of the two hands.

Thereafter, the robot generates a path of the arms to perform the grasping motions in order corresponding to the grasping motion path (Operation 307).

If the path of the arms is not generated in order corresponding to the grasping motion path, the arm path generation unit 230 stores the failed grasping motion path in the storage unit 235, and transmits data regarding the failed grasping motion path to the grasping motion path generation unit 220 so as to decide another grasping motion path.

Now, the above grasping motion path decision and arm path decision will be described with reference to FIGS. 7 to 9.

Figure 7:
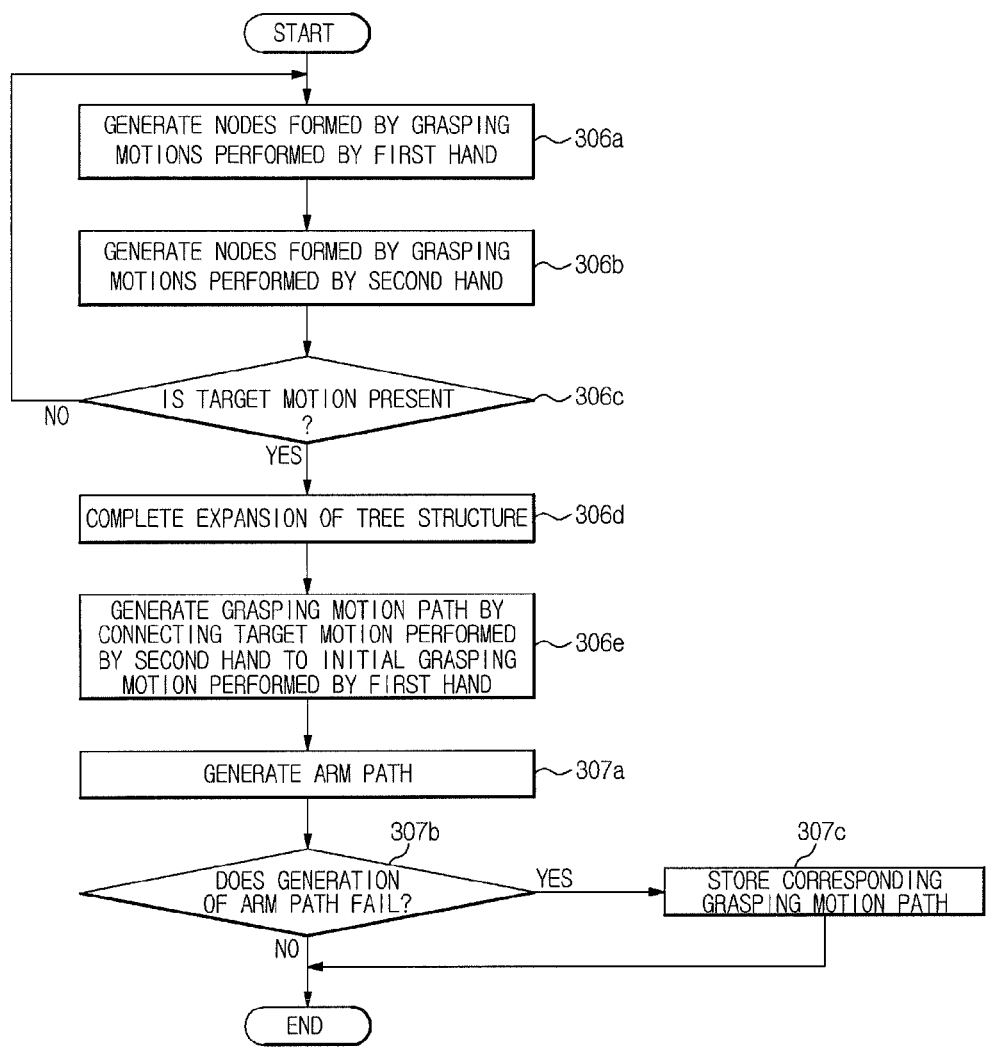
FIG. 7 is a detailed flow chart illustrating generation of a grasping motion path and an arm path of the robot in accordance with an embodiment.
Figure 8:
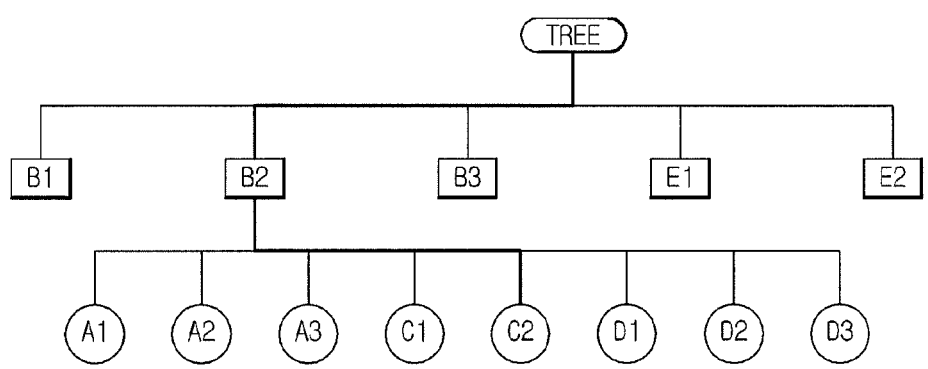
FIGS. 8 to 10 are exemplary views illustrating tree structures of a hammer, which is a target object, in accordance with an embodiment.
Figure 9:
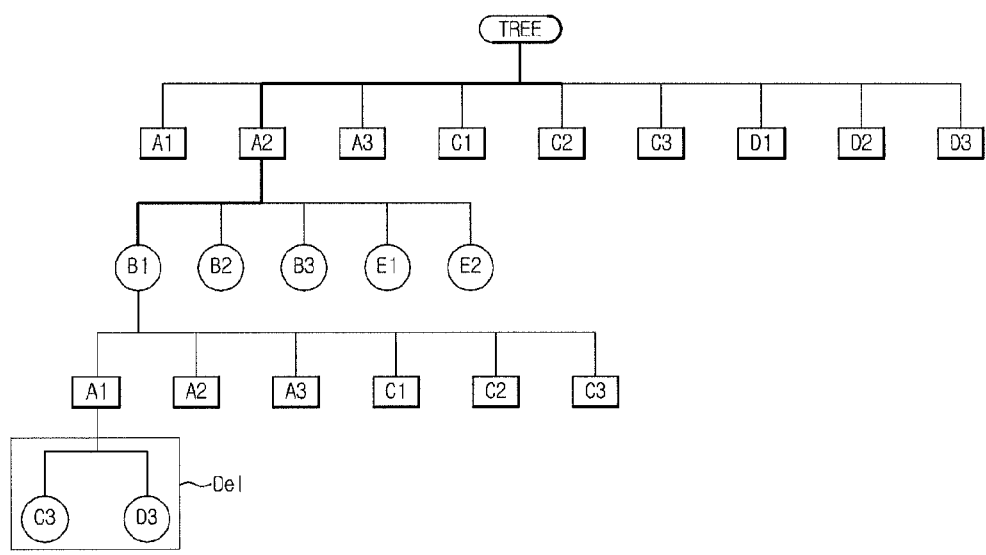
Figure 10:
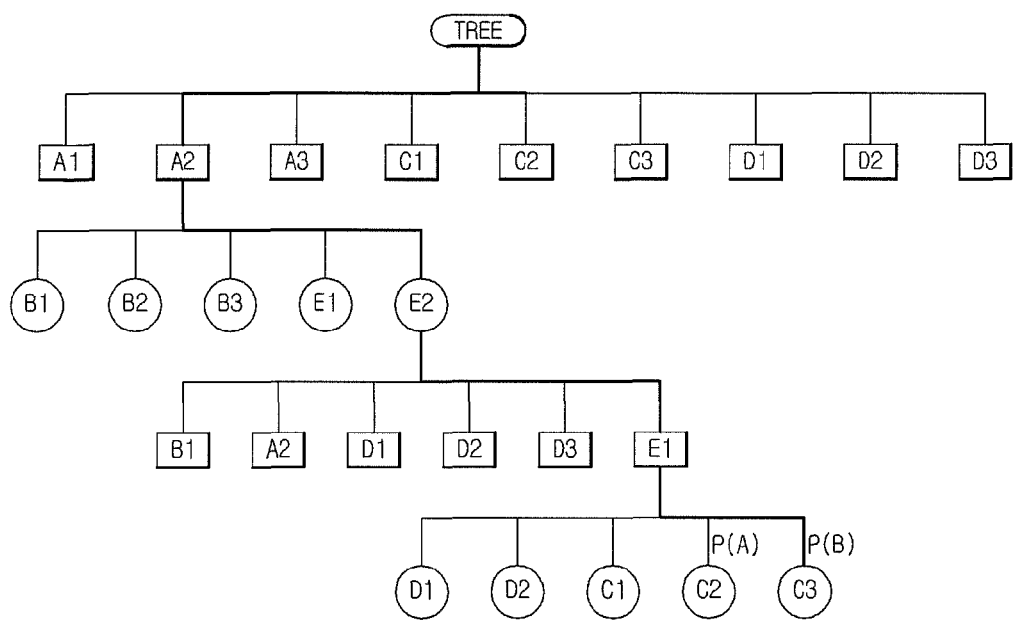

FIG. 7 is a flow chart illustrating decision of a grasping motion path and decision of an arm path, FIG. 8 is a view illustrating a tree structure if an obstacle is present around a handle of a hammer, and FIGS. 9 and 10 are views illustrating tree structures if an obstacle is present around a hitting member of a hammer.

Here, a rectangle represents a grasping motion of the first hand and a circle represents a grasping motion of the second hand. Hereinafter, a case in which the robot grasps a hammer with the first hand and then transfers the hammer from the first hand to the second hand so as to regrasp the hammer with the second hand and a grasping motion of the second hand becomes a target grasping motion will be exemplarily described.

If an obstacle is present around the handle of the hammer, as shown in FIG. 8, the robot detects grasping motions which the first hand may perform to grasp target object with the first hand while avoiding collision with the obstacle, and generates first nodes using the detected grasping motions. Here, the grasping motions of the first nodes are grasping motions B1, B2, B3, E1 and E2.

Thereafter, second nodes which are lower nodes of the first nodes are respectively generated. That is, the robot detects grasping motions which the second hand may perform during the respective grasping motions of the first nodes, and generates second nodes using the detected gasping motions.

For example, the grasping motions performed by the second hand during the grasping motion B2 of the first node are grasping motions A1, A2, A3, C1, C2, D1, D2 and D3. The grasping motions A1, A2, A3, C1, C2, D1, D2 and D3 generate the second nodes.

Here, the robot judges whether or not a target grasping motion is present among the grasping motions of the second nodes performed by the second hand. At this time, the grasping motions C2 and C3 function as target grasping motions and it is understood that the target grasping motion C2 is present among the grasping motions of the second nodes. Then, expansion of the tree structure is completed.

As described above, lower nodes are continuously expanded until the target grasping motion is detected from nodes corresponding to grasping motions performed by the second hand, thereby generating a first tree.

If the target grasping motion is present among the nodes performed by the second hand, the robot connects such a target grasping motion to the first grasping motion, i.e., the initial grasping motion, (C2→B2), thereby generating a grasping motion path (B2→C2).

If an obstacle is present around the hitting member of the hammer, as shown in FIGS. 9 and 10, the robot detects grasping motions which the first hand may perform to grasp the target object while avoiding collision with the obstacle, and generates first nodes using the detected grasping motions (Operation 306a).

Here, the grasping motions of the first nodes are grasping motions A1, A2, A3, C1, C2, C3, D1, D2 and D3.

Thereafter, the robot respectively generates second nodes which are lower nodes of the first nodes (Operation 306b). The robot detects grasping motions which the second hands may perform during the respective grasping motions of the first nodes, and generates second nodes using the detected grasping motions.

For example, the grasping motions performed by the second hand during the grasping motion A2 of the first node are grasping motions B1, B2, B3, E1 and E2, and the grasping motions B1, B2, B3, E1 and E2 generate the second nodes.

Here, the robot judges whether or not a target grasping motion is present among the grasping motions of the second nodes performed by the second hand (Operation 306c). At this time, the grasping motions C2 and C3 function as target grasping motions and it is understood that no target grasping motion is present among the grasping motions of the second nodes.

Therefore, the robot detects grasping motions which the first hand may perform during the grasping motions B1, B2, B3, E1 and E2 of the second nodes, generates third nodes using the detected grasping motions, detects grasping motions which the second hand may perform during the grasping motions of the third nodes, generates fourth nodes using the detected grasping motions.

Here, the robot judges whether or not a target grasping motion is present among the grasping motions of the fourth nodes performed by the second hand. At this time, the grasping motions C2 and C3 function as the target grasping motions. If a target grasping motion is present among the grasping motions of the fourth nodes, the robot completes expansion of the tree structure (Operation 306d), and if no target grasping motion is present among the grasping motions of the fourth nodes, the robot continues expansion of the tree structure, thereby generating a second tree.

At this time, as shown in FIG. 9, grasping motions of the fourth nodes, which are lower nodes of the grasping motion A1 of the third node, are the grasping motions C3 and D3 and it is understood that the target grasping motion C3 is present among the grasping motions of the fourth nodes.

Therefore, if the target grasping motion is present among the nodes performed by the second hand, the robot connects such a target grasping motion to the first grasping motion, i.e., the initial grasping motion, (C3→A1→B1→A2), thereby generating a grasping motion path (A2→B1→A1→C3).

Thereafter, the robot generates a path of arms to perform the grasping motion path (A2→B1→A1→C3) (Operation 307a).

If the robot fails to generate a path of the arms at the grasping motion A1 performed by the first hand during generation of the path of the arms corresponding to the grasping motion path (A2→B1→A1→C3) (Operation 307b), the robot stores the corresponding grasping motion path (Operation 307c) and transmits arm path generation failure data to the grasping motion path generation unit 220.

Here, the robot deletes the grasping motions C3 and D3 of the fourth nodes which are lower nodes of the grasping motion A1 of the third node, and stores a part A2→B1 of the grasping motion path A2→B1→A1→C3 as a successful path and the remaining part after the failed grasping motion A1 as a failed path, thereby causing the grasping motion path A2→B1→A1 not to be generated during generation of the next grasping motion path. That is, the robot generates only the lower nodes of the remaining gasping motions A2, A3, C1, C2 and C3 of the third nodes.

If the robot fails to generate the path of the arms, the robot generates and decides another grasping motion path, generates a path of the arms, judges whether or not generation of the path of the arms succeeds, and, if generation of the path of the arms succeeds, transmits grasping motion path data and arm path data to the control unit 240.

Here, if plural grasping motion paths are generated, a grasping motion path having the minimum cost during generation of the path of the arms is decided as the final grasping motion path.

This will be described with reference to FIG. 10, as follows.

If grasping motions of the fourth nodes, which are lower nodes of the grasping motion E1 of the third node, are grasping motions D1, D2, C1, C2 and C3, as shown in FIG. 10, plural grasping motion paths, i.e., a first grasping motion path P(A)A2→E2→E1→C2 and a second grasping motion path P(B)A2→E2→E1→C3, are generated.

Here, if generation of paths of the arms at the first and second grasping motion paths P(A) and P(B) succeeds, the robot may decide the grasping motion path having the target grasping motion having the highest priority among the target grasping motions C2 and C3 as the final grasping motion path, or decide the grasping motion path having lower cost, through comparison of costs of the first and second grasping motion paths P(A) and P(B) during generation of the paths of the arms, as the final grasping motion path.

Here, the cost means naturalness of joint angles of the arm. As the cost decreases, the joint angle of the arm becomes more natural.

When the grasping motion path and the arm path are decided, the robot drives the arms and the hands based on the decided grasping motion path and arm path, thereby performing grasping of the target object.

In more detail, the robot calculates torques to track the arm path based on arm path data (Operation 308). In more detail, the robot calculates torques of the rotary joints in the pitch direction and the rotary joints in the roll direction of the shoulder joint units, calculates torques of the rotary joints in the pitch direction and the rotary joints in the yaw direction of the elbow joint units and calculates torques of the rotary joints in the pitch direction and the rotary joints in the roll direction of the wrist joint units based on the arm path data.

Further, the robot calculates torques of the plural joints 152d, 152e, 152f, 153d, 153e and 153f of the hands 150R and 150L based on the grasping motion path data.

Thereafter, the robot outputs PWM signals to track the torques of the respective joints toward the respective joints provided on the arms, thereby driving the rotary joints in the pitch direction and the rotary joints in the roll direction of the shoulder joint units, driving the rotary joints in the pitch direction and the rotary joints in the yaw direction of the elbow joint units and driving the rotary joints in the pitch direction and the rotary joints in the roll direction of the wrist joint units (Operation 309).

Thereafter, the robot drives the plural joints 152d, 152e, 152f, 153d, 153e and 153f of the hands 150R and 150L, thereby performing grasping of the target object (Operation 310).

As is apparent from the above description, a robot and a control method thereof in accordance with an embodiment generate a grasping motion path of a target object corresponding to a user's desired purpose and generate a path of arms to perform the generated grasping motion path, thereby reducing time taken to calculate paths of hands and arms during grasping of the target object to increase calculating efficiency, minimizing generation of the path of the arms, and allowing an arm path calculating process to be performed at the late stage of a grasping control process to improve grasping performance.

Further, the robot and the control method thereof, if a hand desired to grasp the target object has difficulty in grasping the target object, allow another hand to assist grasping of the target object, thereby increasing accuracy in grasping the target object and facilitating grasping of the target object.

Moreover, the robot and the control method thereof allow the grasping motion path and the arm path to be generated in off-line and then perform grasping of the target object in on-line, thereby being capable of performing stable grasping of the target object.

The embodiments can be implemented in computing hardware and/or software, such as (in a non-limiting example) any computer that can store, retrieve, process and/or output data and/or communicate with other computers. For example, input unit 205, detection unit 210, target object recognition unit 215, grasping motion path generation unit 220, arm path generation unit 230, control unit 240, drive unit 245, database unit 225 and/or storage unit 235 in FIG. 3 may include a computer to perform computations and/or operations described herein. A program/software implementing the embodiments may be recorded on non-transitory computer-readable media comprising computer-readable recording media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A robot comprising:
    a database unit to store a plurality of grasping motions of each of target objects;
    an input unit to receive data of a respective target object;
    a grasping motion path generation unit to decide a target grasping motion among the plurality of grasping motions based on a grasping purpose among the data of the respective target object and to decide a grasping motion path based on the decided target grasping motion;
    an arm path generation unit to generate a path of arms of the robot corresponding to the grasping motion path; and
    a control unit to calculate torques to track the path of the arms and to output the torques to the arms so as to control movement of the arms and to control grasping of the target object.

2. The robot according to claim 1, wherein the arm path generation unit, if generation of the path of the arms corresponding to the grasping motion path fails during generation of the path of the arms which thereby results in a failed grasping motion path, stores the failed grasping motion path and transmits the failed grasping motion path to the grasping motion path generation unit.

3. The robot according to claim 2, wherein, during storage of the failed grasping motion path, the arm path generation unit stores former grasping motions, including successful grasping motions among plural grasping motions forming the failed grasping motion path, as a successful path and stores grasping motions after a failed grasping motion as a failed path.

4. The robot according to claim 1, wherein
the decided target grasping motion includes at least one target grasping motion, and
the grasping motion path generation unit:
    generates first nodes as initial grasping motions which a first hand may perform,
    judges whether or not a target grasping motion of the at least one target grasping motion is present among the first nodes,
    completes expansion of a tree structure if a target grasping motion of the at least one target grasping motion is present among the first node, and
    expands lower nodes from the first nodes so as to generate the tree structure if a target grasping motion of the at least one target grasping motion is not present among the first nodes.

5. The robot according to claim 1, wherein
the decided target grasping motion includes at least one target grasping motion, and
the grasping motion path generation unit, if a second hand performs grasping of the target object,
    generates first nodes of a tree structure as initial grasping motions which a first hand may perform,
    generates second nodes of the tree structure as grasping motions which the second hand may perform during the initial grasping motions,
    judges whether or not a target grasping motion of the at least one target grasping motion is present among the second nodes,
    completes expansion of the tree structure if a target grasping motion of the at least one target grasping motion is present among the second nodes, and
    expands lower nodes from the second nodes so as to generate the tree structure if a target grasping motion of the at least one target grasping motion is not present among the second nodes.

6. The robot according to claim 5, wherein the grasping motion path generation unit decides the grasping motion path by connecting, using the tree structure, a grasping motion performed by the second hand to an initial grasping motion performed by the first hand.

7. The robot according to claim 6, wherein the arm path generation unit generates the path of the arms corresponding to an order of the grasping motions forming the grasping motion path.

8. The robot according to claim 1, wherein
the grasping motion path generation unit decides a plurality of grasping motion paths, and
the arm path generation unit generates paths of the arms respectively corresponding to the plurality of grasping motion paths, calculates costs of the paths the arms, and decides a respective path of the arms having the minimum cost.

9. The robot according to claim 1, further comprising:
    a detection unit to capture an image of the target object and a surrounding image of the target object; and
    a target object recognition unit to recognize a position of the target object and an obstacle around the target object and to recognize a position of the obstacle,
    wherein the grasping motion path generation unit decides an initial grasping motion based on the position of the target object and the position of the obstacle.

10. The robot according to claim 9, wherein the detection unit is an image capturing unit to capture the image of the target object, or a distance sensor or an RF sensor to detect the image of the target object.

11. A control method of a robot comprising:
by at least one computer:
recognizing a current position of a target object by detecting the target object when the robot receives data of the target object;
deciding an initial grasping motion performed by a first hand of the robot among a plurality of grasping motions stored in advance based on the current position of the target object;
deciding a target grasping motion performed by a second hand of the robot among the plurality of grasping motions stored in advance based on a grasping purpose of the target object;
generating a tree structure based on the initial grasping motion;
generating a grasping motion path connecting the initial grasping motion to the target grasping motion based on the tree structure;
generating a path of arms of the robot corresponding to the grasping motion path;
calculating torques to track the path of the arms;
controlling movement of the arms by outputting the torques toward the arms; and
controlling grasping of the target object from the first hand to the second hand.

12. The control method according to claim 11, wherein said deciding an initial grasping motion includes:
judging whether or not an obstacle is present adjacent to the target object from surrounding data of the target object;
recognizing a position of the obstacle; and
deciding the initial grasping motion by utilizing the position of the obstacle.

13. The control method according to claim 12, wherein the surrounding data of the obstacle are obtained based on a detected surrounding image of the target object.

14. The control method according to claim 12, wherein the surrounding data of the obstacle are obtained based on a signal output from a distance sensor or an RF sensor and reflected by the target object.

15. The control method according to claim 11, wherein said generating a path of arms includes:
if the generation of the path of the arms fails which thereby results in a failed grasping motion path, storing the failed grasping motion path; and
utilizing data regarding the failed grasping motion path during generation of a next grasping motion path.

16. The control method according to claim 15, wherein said utilizing data includes storing former grasping motions, including successful grasping motions among plural grasping motions forming the failed grasping motion path, as a successful path, and storing grasping motions after the failed grasping motion as a failed path.

17. The control method according to claim 11, wherein
said deciding a target grasping motion decides at least one target grasping motion; and
said generating a grasping motion path includes:
generating first nodes of a tree structure as initial grasping motions which a first hand may perform,
generating second nodes of the tree structure as grasping motions which the second hand may perform during the initial grasping motions,
judging whether or not a target grasping motion of the at least one target grasping motion is present among the second nodes, and
completing expansion of the tree structure if a target grasping motion of the at least one target grasping motion is present among the second nodes, and
expanding lower nodes from the second nodes so as to generate the tree structure if a target grasping motion of the at least one target grasping motion is not present among the second nodes.

18. The control method according to claim 11, wherein
said generating a grasping motion path generates a plurality of grasping motion paths; and
said generating a path of arms includes:
generating paths of the arms respectively corresponding to the plurality of grasping motion paths,
calculating costs of the paths the arms, and
deciding a respective path of the arms having the minimum cost.

19. The control method according to claim 18, further comprising storing the decided respective path of the arms having the minimum cost.

20. The control method according to claim 11, further comprising:
if the robot receives data of an object from a user, detecting the data of the object; and
generating a plurality of grasping motions based on the data of the object and storing the plurality of grasping motions.

21. A control method of a robot comprising:
by at least one computer:
generating a plurality of grasping motions corresponding to data of a target object and storing the plurality of grasping motions;
selecting a grasping motion corresponding to a grasping purpose of the target object among the plurality of grasping motions;
generating a path of arms of the robot corresponding to the selected grasping motion;
calculating torques to track the path of the arms; and
outputting the torques toward the arms so as to perform movement of the arms and grasping of the target object.

22. The control method according to claim 21, further comprising:
generating paths of the arms corresponding to more than one grasping motion;
calculating costs of the paths the arms; and
selecting a grasping motion corresponding to a path of the arms having a minimum cost.

23. The control method according to claim 22, wherein the costs are based on at least one of moving times, moving distances and energy consumption rates of the arms.

* * * * *

UNITED STATES PATENT AND TRADEMARK OFFICE
CERTIFICATE OF CORRECTION

| | | |
|---|---|---|
| PATENT NO. | : 8,768,512 B2 | Page 1 of 1 |
| APPLICATION NO. | : 13/327857 | |
| DATED | : July 1, 2014 | |
| INVENTOR(S) | : San Lim et al. | |

It is certified that error appears in the above-identified patent and that said Letters Patent is hereby corrected as shown below:

In the Claims

Column 16, Line 52, In Claim 8, delete "paths" and insert -- paths of --, therefor.

Column 16, Line 21, In Claim 18, delete "paths" and insert -- paths of --, therefor.

Column 18, Line 51, In Claim 22, delete "paths" and insert -- paths of --, therefor.

Signed and Sealed this
Fourth Day of November, 2014

Michelle K. Lee
*Deputy Director of the United States Patent and Trademark Office*

UNITED STATES PATENT AND TRADEMARK OFFICE
CERTIFICATE OF CORRECTION

PATENT NO.        : 8,768,512 B2                                       Page 1 of 1
APPLICATION NO.   : 13/327857
DATED             : July 1, 2014
INVENTOR(S)       : San Lim et al.

It is certified that error appears in the above-identified patent and that said Letters Patent is hereby corrected as shown below:

In the Claims

Column 16, Line 52, In Claim 8, delete "paths" and insert -- paths of --, therefor.

Column 18, Line 21, In Claim 18, delete "paths" and insert -- paths of --, therefor.

Column 18, Line 51, In Claim 22, delete "paths" and insert -- paths of --, therefor.

This certificate supersedes the Certificate of Correction issued November 4, 2014.

Signed and Sealed this
Twenty-fifth Day of November, 2014

Michelle K. Lee
*Deputy Director of the United States Patent and Trademark Office*